(12) United States Patent
Cordova et al.

(10) Patent No.: US 12,120,579 B2
(45) Date of Patent: Oct. 15, 2024

(54) METHODS AND SYSTEMS FOR ORIENTING A MOBILE DEVICE TO A VEHICLE'S REFERENCE FRAME

(71) Applicant: Cambridge Mobile Telematics Inc., Cambridge, MA (US)

(72) Inventors: Brad Cordova, Cambridge, MA (US); Sanujit Sahoo, Boston, MA (US); Sushrut Karnik, Cambridge, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 17/406,373

(22) Filed: Aug. 19, 2021

(65) Prior Publication Data
US 2022/0046387 A1 Feb. 10, 2022

Related U.S. Application Data

(62) Division of application No. 15/486,053, filed on Apr. 12, 2017, now Pat. No. 11,134,360.
(Continued)

(51) Int. Cl.
*H04W 4/029* (2018.01)
*G01C 21/20* (2006.01)
(Continued)

(52) U.S. Cl.
CPC ............ *H04W 4/029* (2018.02); *G01C 21/20* (2013.01); *H04M 1/725* (2013.01); *H04W 4/026* (2013.01);
(Continued)

(58) Field of Classification Search
None
See application file for complete search history.

(56) References Cited

U.S. PATENT DOCUMENTS 6,240,368 B1 * 5/2001 Kreft ...................... G01C 21/30
701/411
7,417,364 B2 8/2008 Wegman et al.
(Continued)

FOREIGN PATENT DOCUMENTS

EP 2738650 A1 6/2014

OTHER PUBLICATIONS

Luyang Liu, Cagdas Karatas, Hongyu Li, Sheng Tan, Marco Gruteser, Jie Yang, Yingying Chen, and Richard P. Martin. 2015. Toward Detection of Unsafe Driving with Wearables. In Proceedings of the 2015 workshop on Wearable Systems and Applications (WearSys '15). (Year: 2015).*
(Continued)

*Primary Examiner* — Matthew G Marini
(74) *Attorney, Agent, or Firm* — Kilpatrick Townsend & Stockton LLP

(57) ABSTRACT

A method of providing a quaternion for reference frame transformation includes (a) initiating a driving event in a vehicle having a vehicle reference frame and (b) receiving, from a mobile device, mobile device data associated with a time stamp. The method also includes (c) computing a quaternion operable to transform the mobile device data to the vehicle reference frame and (d) determining if the driving event is complete. The method further includes incrementing the time stamp and iterating steps (a), (b), (c), and (d) if the driving event is not complete and providing the quaternion for reference frame transformation if the driving event is complete.

12 Claims, 8 Drawing Sheets

Related U.S. Application Data

(60) Provisional application No. 62/324,168, filed on Apr. 18, 2016.

(51) Int. Cl.
*H04M 1/725* (2021.01)
*H04W 4/02* (2018.01)

(52) U.S. Cl.
CPC .... *H04M 2250/10* (2013.01); *H04M 2250/12* (2013.01)

(56) References Cited

U.S. PATENT DOCUMENTS

| | | | |
|---|---|---|---|
| 9,068,843 B1 | 6/2015 | Sohn et al. | |
| 2013/0135312 A1 | 5/2013 | Yang et al. | |
| 2013/0151195 A1 | 6/2013 | Marinoni | |
| 2014/0180731 A1* | 6/2014 | Cordova | G06Q 40/08 705/4 |
| 2014/0278206 A1* | 9/2014 | Girod | G01C 21/165 702/141 |
| 2014/0370919 A1 | 12/2014 | Cordova et al. | |
| 2016/0325756 A1 | 11/2016 | Cordova et al. | |
| 2016/0327396 A1 | 11/2016 | Hallberg | |

OTHER PUBLICATIONS

Sato et al., Research on Measurement Method of Road Gradient and Altitude by On-Road Driving Susumu Sato, Toshiro Yamamoto, Yasuhiro Ogawa and Noriko Fukuro National Traffic Safety and Environment Laboratory (NTSEL), SAE Int. J. Fuels Lubr. | vol. 2 | Issue 1 (Year: 2009).*

U.S. Appl. No. 15/486,053, "Advisory Action", Aug. 5, 2019, 3 pages.
U.S. Appl. No. 15/486,053, "Final Office Action", Jul. 1, 2020, 10 pages.
U.S. Appl. No. 15/486,053, "Final Office Action", Mar. 3, 2021, 14 pages.
U.S. Appl. No. 15/486,053, "Final Office Action", May 24, 2019, 10 pages.
U.S. Appl. No. 15/486,053, "Non-Final Office Action", Nov. 4, 2019, 9 pages.
U.S. Appl. No. 15/486,053, "Non-Final Office Action", Dec. 27, 2018, 10 pages.
U.S. Appl. No. 15/486,053, "Non-Final Office Action", Nov. 5, 2020, 11 pages.
U.S. Appl. No. 15/486,053, "Notice of Allowance", May 19, 2021, 6 pages.
U.S. Appl. No. 15/486,053, "Restriction Requirement", Sep. 24, 2018, 6 pages.
Ben-Ari, "A Tutorial on Euler Angles and Quaternions, Department of Science Teaching Weizmann Institute of Science", Version 2.0.1, Available online at: https://www.weizmann.ac.il/sci-tea/benari/sites/sci-tea.benari/files/uploads/softwareAndLearningMaterials/quaternion-tutorial-2-0-1.pdf, 2014, 22 pages.
Bhoraskar, et al., "Wolverine: Traffic and Road Condition Estimation Using Smartphone Sensors", Fourth International Conference on Communication Systems and Networks, 2012, 6 pages.
Wang, et al., "Determining Driver Phone Use by Exploiting Smartphone Integrated Sensors", IEEE Transactions on Mobile Computing, vol. 1, No. 1, 2014, 15 pages.
Zhang, et al., "Mobile Sensing on GSM Channel Utilization at Metropolitan Scales", IEEE 17th International Conference on Computational Science and Engineering,, 2014, pp. 1103-1108.

\* cited by examiner

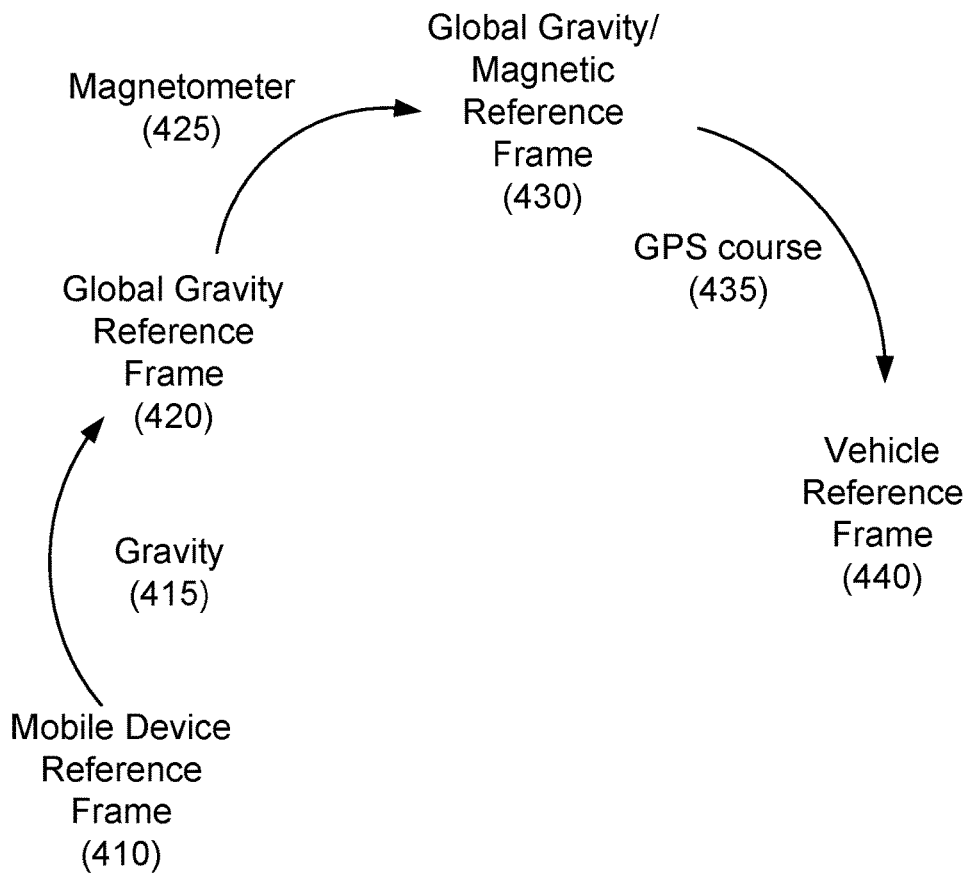
FIG. 4A
    
FIG. 4B   FIG. 4C   FIG. 4D

METHODS AND SYSTEMS FOR ORIENTING A MOBILE DEVICE TO A VEHICLE'S REFERENCE FRAME

CROSS-REFERENCES TO RELATED APPLICATIONS

This application is a divisional application of U.S. patent application Ser. No. 15/486,053, filed on Apr. 12, 2017; which claims priority to U.S. Provisional Patent Application No. 62/324,168, filed on Apr. 18, 2016, the disclosures of which are hereby incorporated by reference in their entirety for all purposes.

BACKGROUND OF THE INVENTION

For insurance and other purposes, driving behavior has been a topic of interest. Some systems have been developed to track driving behaviors including speed, braking, and turn speed. External devices have been integrated with vehicles to track driving behavior.

Despite the progress made in relation to collecting data related to drivers and their driving behavior, there is a need in the art for improved methods and systems related to collecting accurate data for tracking and evaluating driving behavior.

SUMMARY OF THE INVENTION

The present invention relates generally to methods and systems for determining a user's driving behavior during driving events. More particularly, embodiments of the present invention provide methods and systems for using a mobile device to provide information related to a driver's behavior. In some embodiments, methods and systems are provided that enable a mobile device to be oriented related to a reference frame of a vehicle. The present invention is not limited to this particular process, but is applicable to a range of applications.

According to an embodiment of the present invention, a method of orienting a mobile device to a vehicle is provided. The method includes determining an orientation of a gravity vector and aligning a first axis of the mobile device with respect to the gravity vector. The method also includes determining an orientation of a magnetic direction and aligning a second axis of the mobile device with respect to the magnetic direction. The method further includes determining a direction of travel for the vehicle and orienting the mobile device to the vehicle.

According to a particular embodiment of the present invention, a method of providing a quaternion for reference frame transformation is provided. The method includes (a) initiating a driving event in a vehicle having a reference frame and (b) receiving mobile device data associated with a time stamp. The method also includes (c) computing a quaternion operable to transform the mobile device data to the vehicle reference frame and (d) determining if the driving event is complete. If the driving event is not complete, the method includes incrementing the time stamp and iterating steps (a), (b), (c), and (d). If the driving event is complete, the method includes providing the quaternion for reference frame transformation.

According to another embodiment of the present invention, a method of identifying use of a mobile device by a driver of a vehicle during a driving event is provided. The method includes obtaining motion data from the mobile device during the driving event and orienting the obtained motion data to a reference frame of the vehicle. The method also includes determining that the mobile device has moved to the left with respect to the vehicle and determining that a front screen of the mobile device faces to the left with respect to the vehicle. The method further includes identifying use of the mobile device by the driver during the driving event.

According to an alternative embodiment of the present invention, a method of identifying a driver of a vehicle having a vehicle reference frame is provided. The method includes obtaining mobile device motion data in a mobile device reference frame during a driving event and determining that the vehicle has stopped at completion of the driving event. The method also includes obtaining additional mobile device motion data after completion of the driving event and aligning the mobile device motion data and the additional mobile device motion data to the vehicle reference frame. The method further includes determining that a trajectory of the additional mobile device motion data correlates with a direction aligned with a driver side of the vehicle reference frame and identifying the driver of the vehicle based on the trajectory.

According to another alternative embodiment of the present invention, a method of performing exit detection is provided. The method includes receiving motion data from the mobile device, measured in the mobile device reference frame. The method also includes transforming the motion data to the vehicle reference frame and determining that the mobile device is stationary with respect to the vehicle reference frame during a first time period. The method further includes determining that the mobile device is moved with respect to the vehicle reference frame during a second time period. If the movement during the second time period was directed to the left, which indicates that the driver has moved the mobile device, then a determination is made that the driver of the vehicle has exited the vehicle. If the movement during the second time period was directed to the right, which indicates that the passenger has moved the mobile device, then a determination is made that the passenger of the vehicle has exited the vehicle.

Numerous benefits are achieved by way of the present invention over conventional techniques. For example, embodiments of the present invention utilize a mobile device's sensors, including a combination of the magnetometer, the GPS course, and gravity measurements to define (e.g., completely define) the mobile device's orientation with respect to the reference frame of a moving vehicle. These and other embodiments of the invention along with many of its advantages and features are described in more detail in conjunction with the text below and attached figures.

BRIEF DESCRIPTION OF THE DRAWINGS

FIG. 4A is a flow diagram illustrating the method described in relation to FIG. 3.

FIG. 4B illustrates an axis of a global gravity reference frame.

FIG. 4C illustrates axes of a global gravity/magnetic reference frame.

FIG. 4D illustrates an axis of a vehicle reference frame.

DETAILED DESCRIPTION OF SPECIFIC EMBODIMENTS

Figure 1:
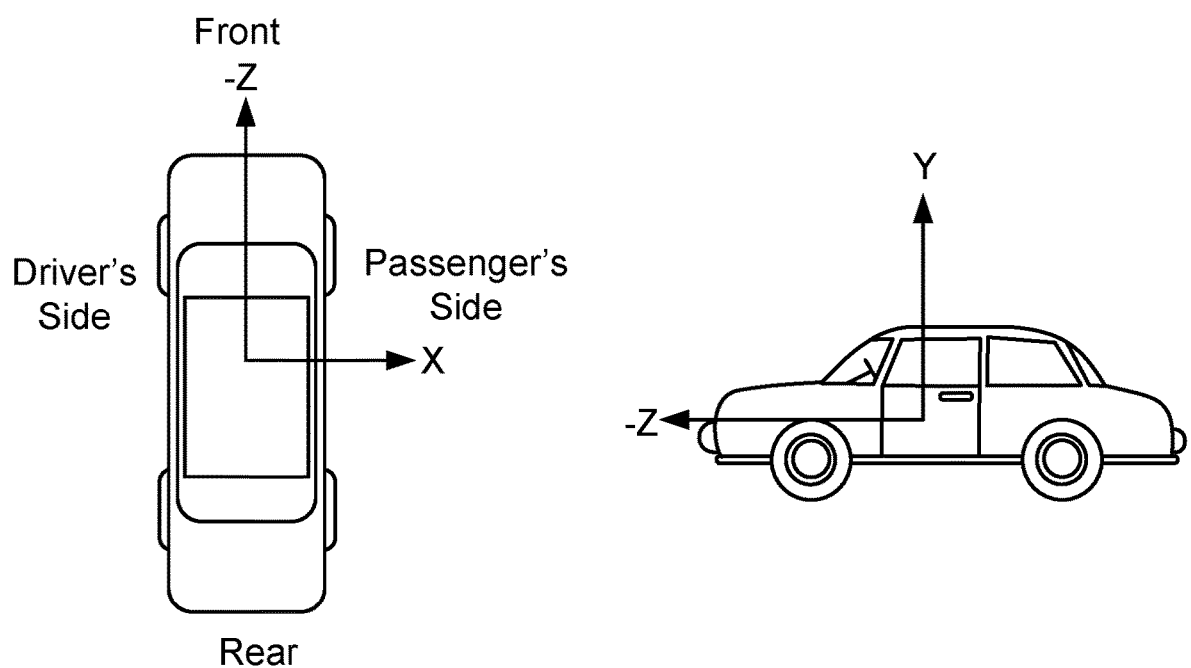
FIG. 1 is a simplified schematic diagram illustrating a reference frame for a vehicle according to an embodiment of the present invention.

Embodiments of the present invention relate generally to methods and systems for determining a user's driving behavior during driving events. More particularly, embodiments of the present invention provide methods and systems for using a mobile device to provide information related to a driver's behavior. In some embodiments, methods and systems are provided that enable a mobile device to be oriented related to a reference frame of a vehicle. The present invention is not limited to this particular process, but is applicable to a range of applications.

Embodiments of the present invention provide a transformation from a mobile device reference frame to a vehicle reference frame that is operable when the mobile device is moving with respect to the vehicle. Thus, embodiments overcome limitations in conventional systems in which this transformation was only available when either the mobile device was in a fixed relationship to the vehicle or was only available during periods of time during which it was known that the mobile device was not moving with respect to the vehicle. Using embodiments of the present invention, motion of the mobile device with respect to the vehicle can be used to identify distracted driving situations and behaviors not possible using conventional techniques. Embodiments of the present invention are applicable to a wide variety of applications that utilize information on the orientation of the mobile device with respect to the reference frame of the vehicle.

According to another embodiment of the present invention, systems and methods to detect exit based on motion of the mobile device (e.g., a phone) in directions that are up and to the left (for a driver) or motion up and to the right (for a passenger) are provided. When a user exits the vehicle, if the mobile device is in their pants pocket, it is possible to detect a rotation around the x-axis of the vehicle, corresponding to the person lifting their foot to step out of the vehicle. This action would then be followed by (or occur simultaneously with) either a positive or negative rotation of the mobile device around the y-axis of the vehicle, depending on whether the person exited on the left or right side of the vehicle. Given the orientation of the mobile device with respect to the vehicle, detection of this sequence of actions is possible and can be utilized to determine if the person exiting the vehicle is a driver or a passenger.

According to a particular embodiment of the present invention, methods and systems for determining that the mobile device is in a direction that faces the driver are provided. This embodiment can be applicable to detecting a phone call, texting, or the like by the driver. The user in the vehicle could be using a mobile device for texting or talking. Once a change in angular position of the mobile device is detected, the mobile device's orientation with respect to the vehicle's reference frame can be determined. For example, if the user is texting, the mobile device's screen would be facing the user and this can be easily detected since the vehicle's reference frame is known.

In another example, a user making a phone call on a mobile phone may hold the phone up to their ear. In this case, the phone' orientation with respect to the vehicle would show the phone facing the side of the vehicle associated with the user (i.e., the side of the user's face).

Another example of a condition in which the alignment of the mobile device's reference frame to that of the vehicle can be applied is brake matching. Once the vehicle's reference frame is determined, the accelerometer signals measured in the mobile device's reference frame can be transformed into the vehicle's reference frame and acceleration in the negative z-direction would be determined as the acceleration of the vehicle. Given this referenced data, it is possible to detect hard brakes, harsh accelerations, and the like.

FIG. 1 is a simplified schematic diagram illustrating a reference frame for a vehicle according to an embodiment of the present invention. The reference frame of the vehicle, also referred to as the vehicle reference frame, is defined such that the horizontal plane of the vehicle is parallel to the plane including the wheels and includes the x-axis and the z-axis. The y-axis is aligned vertically with respect to the horizontal plane of the vehicle and points opposite to a gravity vector when the vehicle is on a level surface. The direction of forward travel of the vehicle is aligned along the negative z-axis and the positive x-axis is aligned along the direction from the driver's side to the passenger's side.

Figure 2:
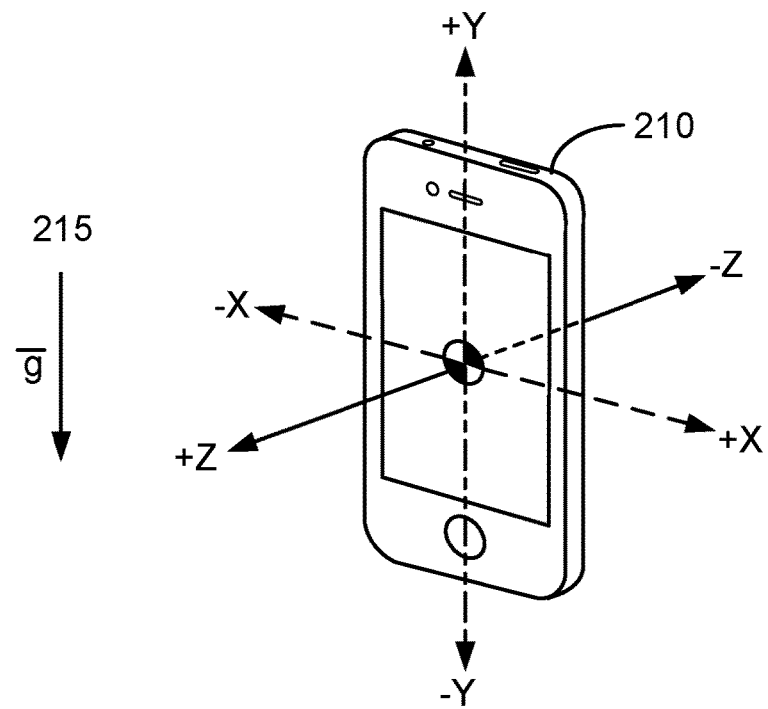
FIG. 2 is a simplified schematic diagram illustrating a reference frame for a mobile device according to an embodiment of the present invention.

FIG. 2 is a simplified schematic diagram illustrating a reference frame for a mobile device according to an embodiment of the present invention. As illustrated in FIG. 2, the mobile device 210, which may be a smart phone, a tablet, or other portable electronic device, has a reference frame defined by axes x, y, and z. The acceleration due to gravity is represented by vector 215, which can also be referred to as gravity vector $g=(g_x, g_y, g_z)$, which is in the mobile device's reference frame. The gravity vector norm (also in the mobile device's reference frame) is $g_{norm}=g/|g|$.

Additional description related to the gravity vector is provided in U.S. patent application Ser. No. 15/149,603, filed on May 9, 2016 and published as U.S. Patent Application Publication No. 2016/0325756, the disclosure of which is hereby incorporated by reference in its entirety for all purposes.

Figure 3:
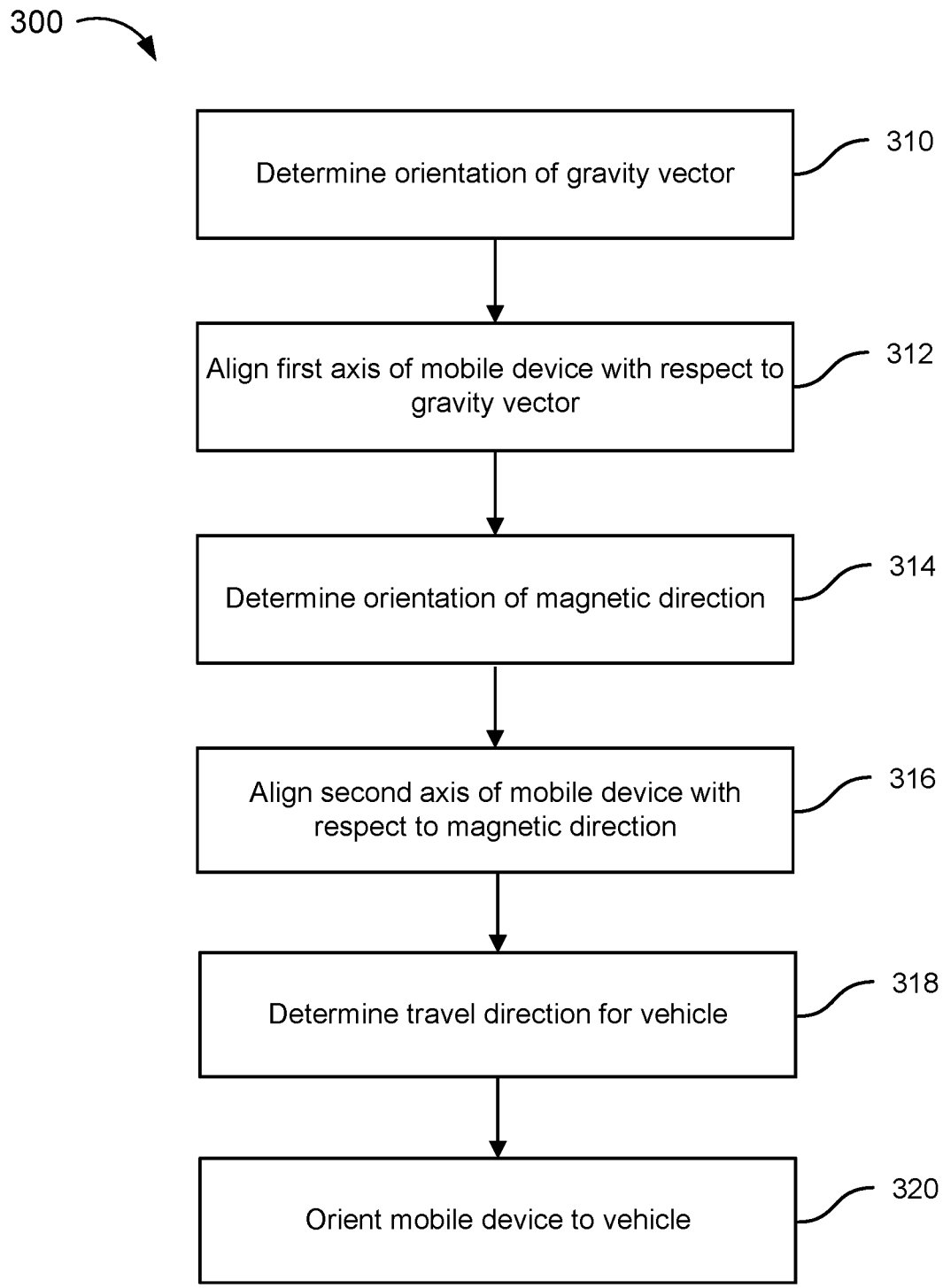
FIG. 3 is a simplified flowchart illustrating a method of orienting a mobile device in the reference frame of a vehicle according to an embodiment of the present invention.

FIG. 3 is a simplified flowchart illustrating a method of orienting a mobile device in the reference frame of a vehicle according to an embodiment of the present invention. FIG. 4A is a flow diagram illustrating the method described in relation to FIG. 3. Thus, the process illustrated in FIG. 3 can be visualized by the flow diagram illustrated in FIG. 4A. The data collected by the mobile device, for example accelerometer data, gyroscope data, and the like, is collected in the reference frame of the mobile device as illustrated in FIG. 2. The right/left sides with the screen facing the user is the x-axis direction, the top/bottom is the y-axis direction, and the front/back is the z-axis direction. As described herein, this data referenced to the mobile device reference frame is converted to data referenced to the vehicle's reference frame. Thus, given data in the reference frame of the mobile device, a transformation is provided that enables the data in the reference frame of the mobile device to be transformed into data in the reference frame of the vehicle. As described herein, by aligning two axes of the mobile device with gravity and with the direction of motion of the vehicle, respectively, given any orientation of the mobile device, the mobile device data can be transformed into the vehicle's reference frame. Utilizing embodiments of the present invention, standardization is possible since irrespective of the mobile device's actual position and orientation, the data stream is referenced to the vehicle's reference frame.

In the embodiments described herein, the convention is used that the top-to-bottom axis of the mobile device is oriented along the direction of gravity and the front-to-back axis of the mobile device is oriented along the direction of motion of the vehicle, but the present invention is not limited to this convention. Other conventions can be utilized as will be evident to one of skill in the art. One of ordinary skill in the art would recognize many variations, modifications, and alternatives.

First, gravity is considered and the gravity vector (415) is used to define a Global gravity reference frame (420). As illustrated in FIG. 4B, which illustrates an axis of a global gravity reference frame, the negative y-axis of the mobile device is aligned with respect to the gravity vector.

In this application, discussion is provided in relation to "aligning" the negative y-axis of the phone with gravity. It should be appreciated that this discussion can also be provided in relation to computing a quaternion that enables data that is received in the mobile device's reference frame to be transformed into a new reference frame that, i.e., the reference frame of the vehicle. Thus, aligning of the axes of the mobile device to the axes of the vehicle and transforming data from the mobile device reference frame to the vehicle reference frame can be considered as different aspects of the same process.

Thus, in this disclosure, methods are described in which one or more axes of the mobile device reference frame are "aligned" with corresponding axes of other reference frames. It should be understood that discussion of this alignment includes a unitary, linear transformation of data measured in the mobile device's reference frame into the other reference frames. Thus, discussion of aligning axes from one reference frame to axes or directions in other reference frames should be understood to include computing quaternions that enable data measured in a first reference frame to be transformed, for example, by using a unitary, linear transformation, into a second reference frame, which can be the reference frame of the vehicle. Given data in the reference frame of the mobile device, it is equivalent to discuss rotating the axes of the mobile device to align with the reference frame of the vehicle, in which case the data measured in the mobile device's reference frame is useful in the reference frame of the vehicle, or to discuss computing the matrix, such as a quaternion, that transform the data from the mobile device's reference frame to the reference frame of the vehicle.

Next, the global gravity reference frame is converted to a global (i.e., earth-based) gravity/magnetic reference frame (430) by aligning the negative z-axis with a magnet direction such as magnetic north. This process can also be discussed in terms of computing a transformation that aligns the negative z-axis with a magnetic direction such as magnetic north. Thus, the gravity and magnetometer data can link the mobile device reference frame to the global (i.e., earth's) reference frame because gravity points to the center of the earth and the magnetic field points north and south.

As illustrated in FIG. 4C, which illustrates axes of a global gravity/magnetic reference frame, the negative y-axis is aligned along gravity and the negative z-axis is aligned with magnetic north although other magnetic directions could be utilized as appropriate. The data from the magnetometer (425) in the mobile device is utilized in this alignment process. Given the transformation from the mobile device's reference frame to the global gravity/magnetic reference frame, magnetometer values measured in the mobile device reference frame can be transformed to the new reference frame. It could be imagined that if the mobile device was rotated to align along gravity and magnetic north, the magnetometer values measured in the mobile device reference frame would be equal to magnetometer values measured in the global gravity/magnetic reference frame.

The GPS course (435) is determined and this information is utilized to align the global gravity/magnetic reference frame to the vehicle reference frame (440). As illustrated in FIG. 4D, which illustrates axes of a vehicle reference frame, the negative y-axis is aligned along gravity and the negative z-axis is aligned with the direction of travel of the vehicle. In this process, the negative z-axis, which was aligned with the magnetic direction (e.g., magnetic north) to provide the global gravity/magnetic reference frame 430, is now aligned with the direction of travel of the vehicle. Given this vehicle reference frame, the data collected in the mobile device reference frame can be transformed into the vehicle reference frame. In some implementations, quaternions associated with transformations from the mobile device reference frame to the global gravity reference frame to the global gravity/magnetic reference frame to the vehicle's reference frame are combined to provide a final quaternion that encompasses all three transformations.

It should be noted that for some implementations, the assumption is made that the gravity points down along the negative y-axis of the vehicle, which is appropriate for travel along level surfaces. As will be evident to one of skill in the art, if the vehicle is travelling uphill or downhill, there may be misalignment between the gravity vector and the negative y-axis of the vehicle. Typically, this is a second order effect and can be compensated for by tracking the altitude of the vehicle, for example, using GPS data, as the vehicle moves and compensating for the non-level travel by use of the measured increase in altitude, as described more fully below.

Referring to FIG. 3, the method includes determining an orientation of a gravity vector (310). During a trip, data from the sensors in the mobile device is collected on a periodic, a non-periodic basis, or a combination thereof. As an example, sensors including an accelerometer, a gyroscope, a magnetometer, and the like can provide data that can be collected, stored, sorted, and the like for use by the systems described herein. As an example, for each time step during a trip, the gravity vector in the phone's reference frame can be provided by a processor in the mobile device. In other implementations, the gravity vector as a function of time is determined by using Kalman filters as described in U.S. Patent Application Publication No. 2016/0325756, incorporated by reference above.

Given the gravity vector g in the reference frame of the mobile device, the method includes aligning a first axis of the mobile device with respect to the gravity vector (312). In an embodiment, the first axis of the mobile device is the negative y-axis of the mobile device. In this embodiment, a reference vector $g_{ref}$ is defined as $g_{ref}=(0, -1, 0)$, which corresponds to the negative y-axis of the mobile device, which will be aligned with gravity as described herein. The angle θ between the reference vector and the gravity vector norm is determined as:

$$\theta = \cos^{-1}(-g_{ref} \cdot g_{norm}).$$

The rotation axis, i.e., the axis around which the mobile device is rotated to align the negative y-axis of the mobile device with the gravity vector, can then be determined as:

$$\bar{v} = (v_x, v_y, v_z) = g_{ref} \times g_{norm}.$$

From $\bar{v}$ and $\theta$, a first quaternion $q_1$ is calculated as:

$$q_w = \cos\left(\frac{\theta}{2}\right)$$

$$q_x = v_x \sin\left(\frac{\theta}{2}\right)$$

$$q_y = v_y \sin\left(\frac{\theta}{2}\right)$$

$$q_z = v_z \sin\left(\frac{\theta}{2}\right)$$

$$q_1 = (q_w, q_x, q_y, q_z),$$

where $v_x = -g_z$, $v_y = 0$, $v_z = g_x$ for gravity alignment.

In order to calculate a magnetometer vector $m_1$ in the gravity-aligned reference frame, the compliment of $q_1$, $q'_1$, is used to rotate the magnetometer vector in the mobile device reference frame to provide the magnetometer vector $m_1$ in the gravity-aligned reference frame as:

$$m_1 = m \otimes q'_1$$

Although the reference vector discussed above aligns the negative y-axis of the mobile device with the gravity vector, this is not required by the present invention and other conventions can be utilized within the scope of the present invention. One of ordinary skill in the art would recognize many variations, modifications, and alternatives.

The method also includes determining the orientation of a magnetic direction (314). In some embodiments, the magnetic direction is Magnetic North. In this embodiment, the negative z-axis of the mobile device in the gravity-aligned reference frame, is aligned with Magnetic North. A reference vector $m_{1ref} = (0, 0, -1)$ is defined as appropriate to the alignment of the negative z-axis with Magnetic North. The norm of the gravity-aligned magnetometer vector $m_1$ can be computed as $m_{1norm} = m_1/|m_1|$.

A magnetic rotation angle $\theta_2$ is calculated as $\theta_2 = \cos^{-1}(m_{1ref} \cdot m_{1norm})$ and a second rotation axis around which the mobile device is rotated to align the negative z-axis with the magnetic direction (e.g., magnetic north) $\bar{v_2} = (v_{2,x}, v_{2,y}, v_{2,z}) = m_{1ref} \times m_{1norm}$ is computed. As discussed above in relation to the alignment of the mobile device's first axis (e.g., negative y-axis) with the gravity vector, a second quaternion ($q_2$) related to the alignment of the second axis with a magnetic direction can be calculated using the second rotation axis and the magnetic rotation angle ($\theta_2$) as:

$$q_{2,w} = \cos\left(\frac{\theta_2}{2}\right)$$

$$q_{2,x} = v_{2,x} \sin\left(\frac{\theta_2}{2}\right)$$

$$q_{2,y} = v_{2,y} \sin\left(\frac{\theta_2}{2}\right)$$

$$q_{2,z} = v_{2,z} \sin\left(\frac{\theta_2}{2}\right)$$

$$q_2 = (q_{2,w}, q_{2,x}, q_{2,y}, q_{2,z}).$$

Given the second quaternion and the complement of the second quaternion ($q'_2$), the method includes aligning a second axis of the mobile device with respect to the magnetic direction (316). Accordingly, the magnetometer vector in the gravity-aligned reference frame ($m_1$) is rotated using a quaternion multiplication to compute the magnetometer vector in the gravity-aligned and magnetic direction-aligned (e.g., magnetic north-aligned) reference frame ($m_2$) as:

$$m_2 = m_1 \otimes q'_2.$$

The travel direction of the vehicle is computed (318) using the GPS course provided by the GPS unit. $\theta_3 = -(\text{gps course})$ and a third rotation axis $\bar{v_3}$ is defined as $\bar{v_3} = (v_{3,x}, v_{3,y}, v_{3,z}) = (0, 1, 0)$. The third quaternion $q_3$, which relates the travel direction of the vehicle to the gravity aligned magnetic direction (e.g., north) is computed as:

$$q_{3,w} = \cos\left(\frac{\theta_3}{2}\right)$$

$$q_{3,x} = v_{3,x} \sin\left(\frac{\theta_3}{2}\right)$$

$$q_{3,y} = v_{3,y} \sin\left(\frac{\theta_3}{2}\right)$$

$$q_{3,z} = v_{3,z} \sin\left(\frac{\theta_3}{2}\right)$$

$$q_3 = (q_{3,w}, q_{3,x}, q_{3,y}, q_{3,z}).$$

Given the first, second, and third quaternions, the method orients the mobile device to the vehicle by computing the final quaternion (q), which describes the orientation of the mobile device with respect to the reference frame of the vehicle:

$$\circ q = q_1 \otimes q_2 \otimes q_3.$$

This final quaternion combines the transformations from the mobile device reference frame to the global gravity reference frame to the global gravity/magnetic reference frame to the vehicle's reference frame such that the final quaternion encompasses all three transformations. It should be noted that the order of the order of the transformations can be modified given suitable changes to the quaternions/compliments. One of ordinary skill in the art would recognize many variations, modifications, and alternatives.

On non-level roads, the above steps could lead to a misalignment with the gravity axis. To correct for this effect, we first calculate the inclination angle ($\theta_4$) of the road using the change in altitude and distance traveled, which are both provided by the GPS unit. A fourth rotation axis $\bar{v_4}$ is defined as $\bar{v_4} = (v_{4,x}, v_{4,y}, v_{4,z}) = (1, 0, 0)$. The quaternion $q_4$, which relates the inclination angle of the road and the gravity and magnetic direction reference frame is computed as:

$$q_{4,w} = \cos\left(\frac{\theta_4}{2}\right)$$

$$q_{4,x} = v_{4,x} \sin\left(\frac{\theta_4}{2}\right)$$

-continued $$q_{4,y} = v_{4,y}\sin\left(\frac{\theta_4}{2}\right)$$

$$q_{4,z} = v_{4,z}\sin\left(\frac{\theta_4}{2}\right)$$

$$q_4 = (q_{4,w}, q_{4,x}, q_{4,y}, q_{4,z}).$$

The final quaternion $q_{final}$ after compensation for non-level roads is calculated as, $$q_{final} = q \otimes q_4.$$

It should be appreciated that the specific steps illustrated in FIG. 3 provide a particular method of orienting a mobile device in the reference frame of a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Utilizing embodiments of the present invention, motion of the mobile device referenced to the vehicle enables categorization of mobile device motions. As an example, a user picking up the phone from the seat and placing the phone by their ear can be distinguished from the user putting the phone back down after a call.

Figure 7:
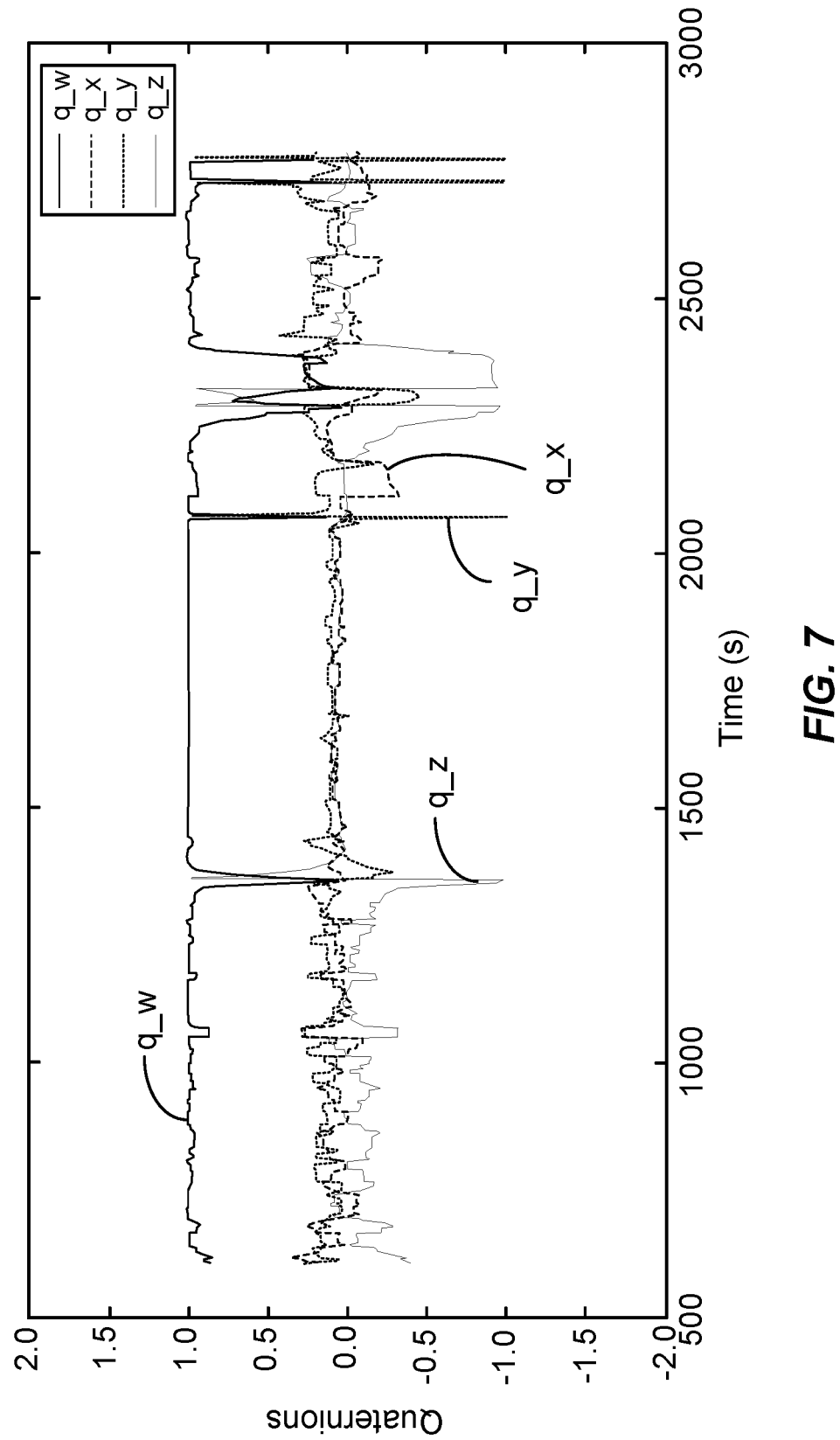
FIG. 7 is a simplified plot illustrating quaternions computed during a driving event according to an embodiment of the present invention.

The methods described herein were tested by conducting the following experiment. A mobile device (i.e., a mobile phone) was placed in a phone mount in a moving car with the negative y-axis of the phone aligned with gravity. The quaternions suitable for aligning the phone to the vehicle reference frame were computed during a driving event and are shown in FIG. 7.

Since the phone's reference frame is already aligned with the vehicle's reference frame, the quaternions $q=(q_w, q_x, q_y, q_z)$ should be close to (1, 0, 0, 0). Referring to FIG. 7, the measurements and computed quaternions demonstrate that for most of the driving event, the computed values are close to the expected value. Thus, the data illustrated in FIG. 7 demonstrates the accuracy and utility of the systems and methods described herein.

Figure 5:
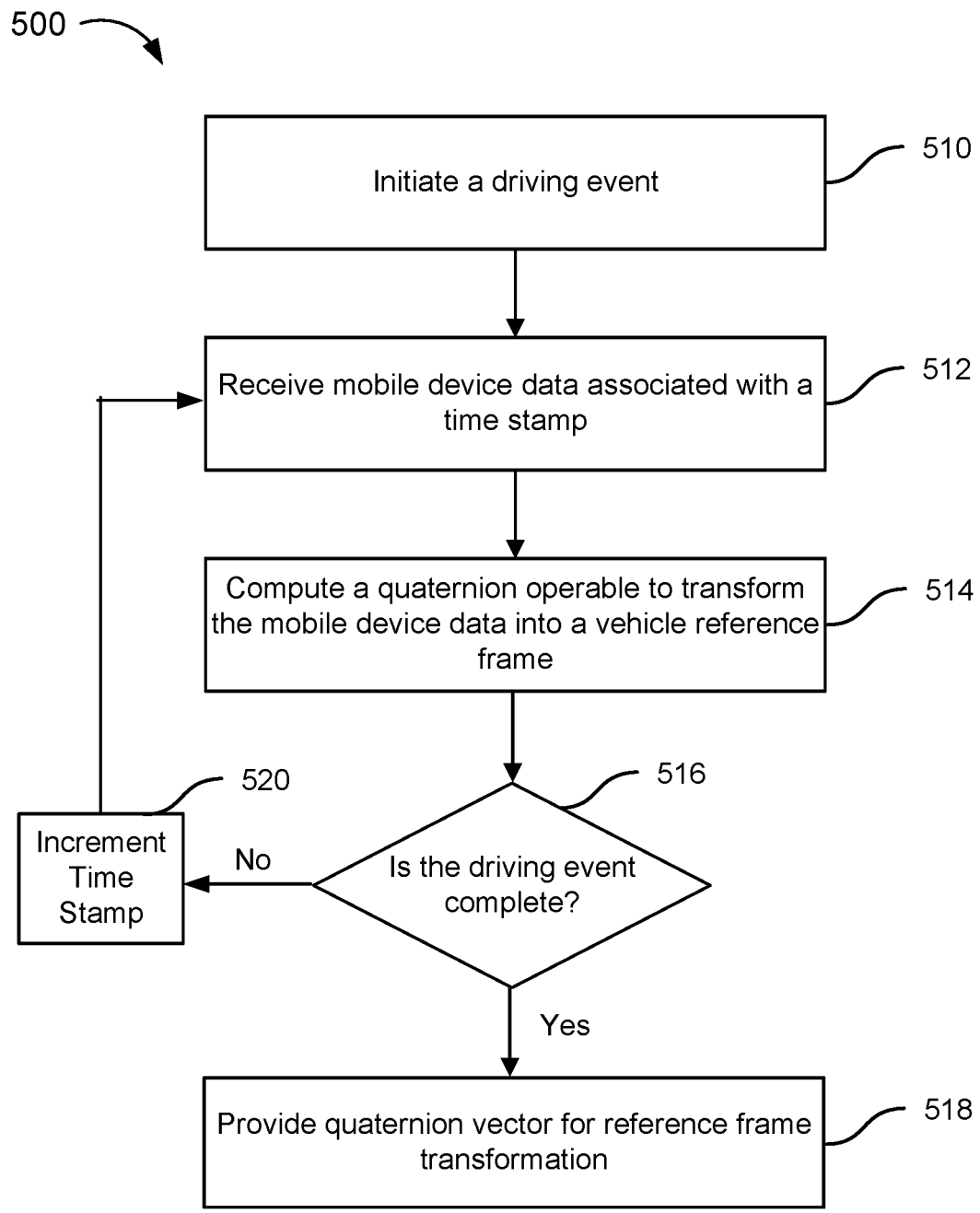
FIG. 5 is a simplified flowchart illustrating a method of transforming mobile device data into vehicle-based data according to an embodiment of the present invention.

FIG. 5 is a simplified flowchart illustrating a method of transforming mobile device data into vehicle-based data according to an embodiment of the present invention. The method includes initiating a driving event (510), receiving mobile device data associated with a time stamp (512), and computing a quaternion to transform the mobile device data to a vehicle reference frame (514). The method also includes determining if the driving event is complete (516). If the driving event is not complete, then the method iterates by incrementing the time stamp (520) and receiving additional mobile device data associated with the incremented time stamp (512). In some embodiments, the iteration cycle time is 1 second, whereas in other embodiments, the iteration cycle time ranges from about 100 ms to about 10 seconds.

Using the mobile device data at the delayed time stamp, a new quaternion is computed (514). Accordingly, a vector can be created over time as quaternions associated with each time step are computed. This vector parameterized by time can be utilized to convert a string of mobile device data in the reference frame of the mobile device into a string of data referenced to the vehicle reference frame. If the driving event is complete, then the final quaternion is utilized to transform the mobile device data in the reference frame of the mobile device into the reference frame of the vehicle (518).

Referring to FIG. 3, the process illustrated in FIG. 3 can thus be performed as a function of time during a driving event as discussed in relation to FIG. 5 to provide a time-based quaternion vector that relates the mobile device data measured in the mobile device reference frame to data presented in the vehicle reference frame.

It should be noted that if the mobile device is fixed in the vehicle during the entire driving event, the final quaternion will be constant since the mobile device's reference frame and the vehicle's reference frames are fixed with respect to each other, resulting in a single relationship between the reference frames of the mobile device and the vehicle during the driving event. This constant final quaternion will represent a single transformation associated with the driving event.

Although the method illustrated in FIG. 5 performs processing of the mobile device data during the drive, for example, computing the quaternion that is used to transform the mobile device data to the vehicle reference frame, this is not required by the present invention. In other implementations, the data collected during the driving event is post-processed after the driving event is completed.

It should be appreciated that the specific steps illustrated in FIG. 5 provide a particular method of transforming mobile device data into vehicle-based data according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
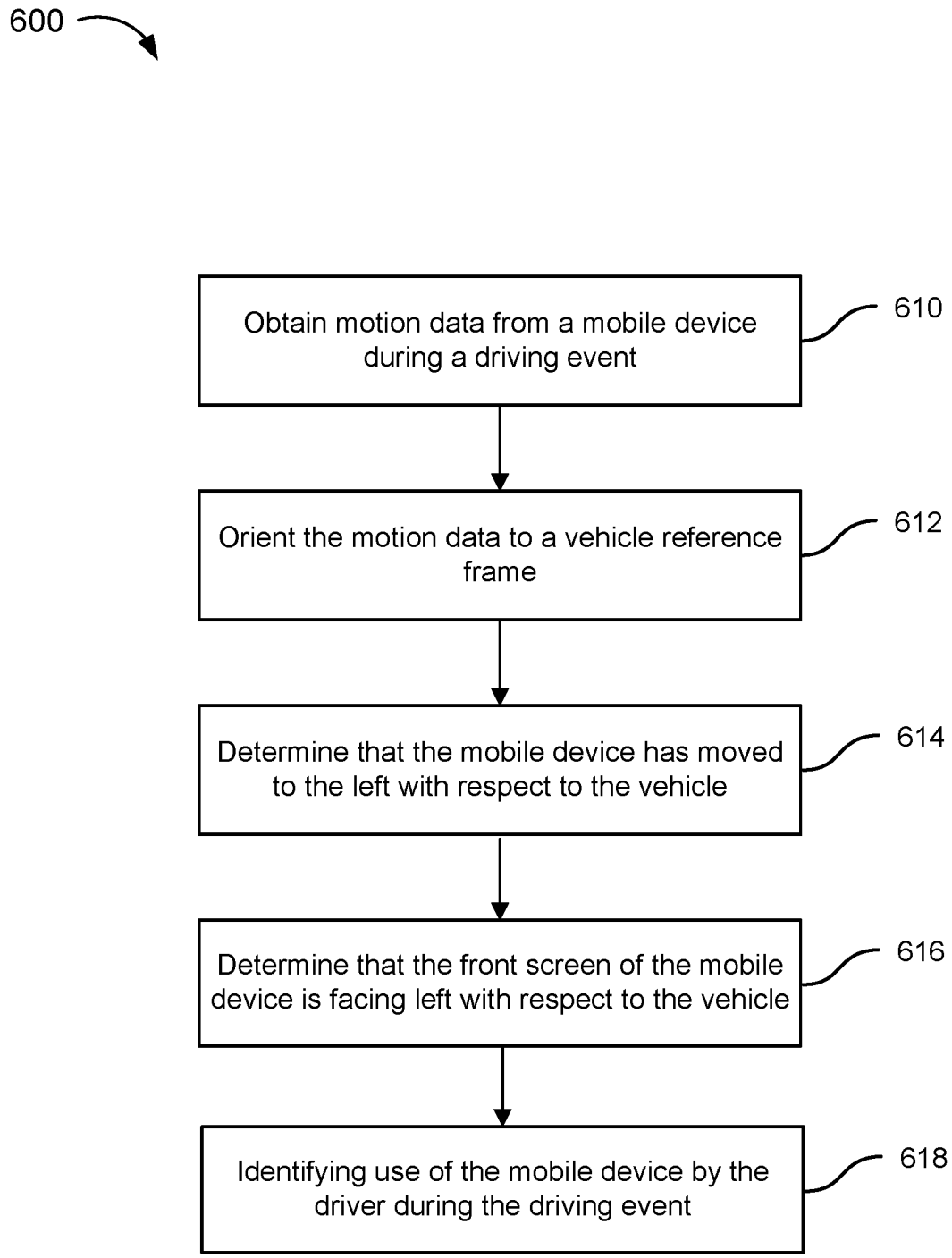
FIG. 6 is a simplified flowchart illustrating a method of identifying use of a mobile device by a driver during a driving event according to an embodiment of the present invention.

FIG. 6 is a simplified flowchart illustrating a method of identifying use of a mobile device by a driver during a driving event according to an embodiment of the present invention. The method includes obtaining motion data from the mobile device during a driving event (610). The mobile device has a front screen. In some embodiments, the motion data includes accelerometer data and/or magnetometer data. The method also includes orienting the motion data to a reference frame of the vehicle (612). The motion data is oriented to the reference frame of the vehicle by aligning a first axis of the mobile device with a gravity vector, aligning a second axis of the mobile device with a magnetic vector, determining a direction of travel for the vehicle, and aligning the second axis to the direction of travel. The determination of the direction of travel for the vehicle can include obtaining course information for the vehicle and aligning a negative z-axis of the vehicle reference frame to the course information.

In an embodiment, the first axis is the negative y-axis. In this embodiment, aligning the negative y-axis of the mobile device with the gravity vector comprises computing a quaternion operable to transform motion data from the mobile device from the negative y-axis to the gravity vector. In another embodiment, the second axis is the negative z-axis. In this embodiment, the magnetic vector is magnetic north.

The method further includes determining, using the oriented motion data, that the mobile device has moved left with respect to the vehicle (614) and determining, using the oriented motion data, that the front screen of the mobile device is facing left with respect to the vehicle (616). Since the mobile device has moved left inside the vehicle and the front screen is facing the driver (i.e., the left hand side of the vehicle), it is possible to identify the use of the mobile device by the driver during the driving event (618). As an example, if the mobile device is a smartphone and the driver picks up the smartphone from the center console or the passenger's seat and places the phone against their right ear, it would be determined that the mobile device has moved left inside the vehicle and that the front screen is facing the driver. The method of identifying the driver's use of the mobile device can be supplemented or combined with other methods of determining the identity of a driver.

It should be appreciated that the specific steps illustrated in FIG. 6 provide a particular method of identifying use of a mobile device by a driver during a driving event according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
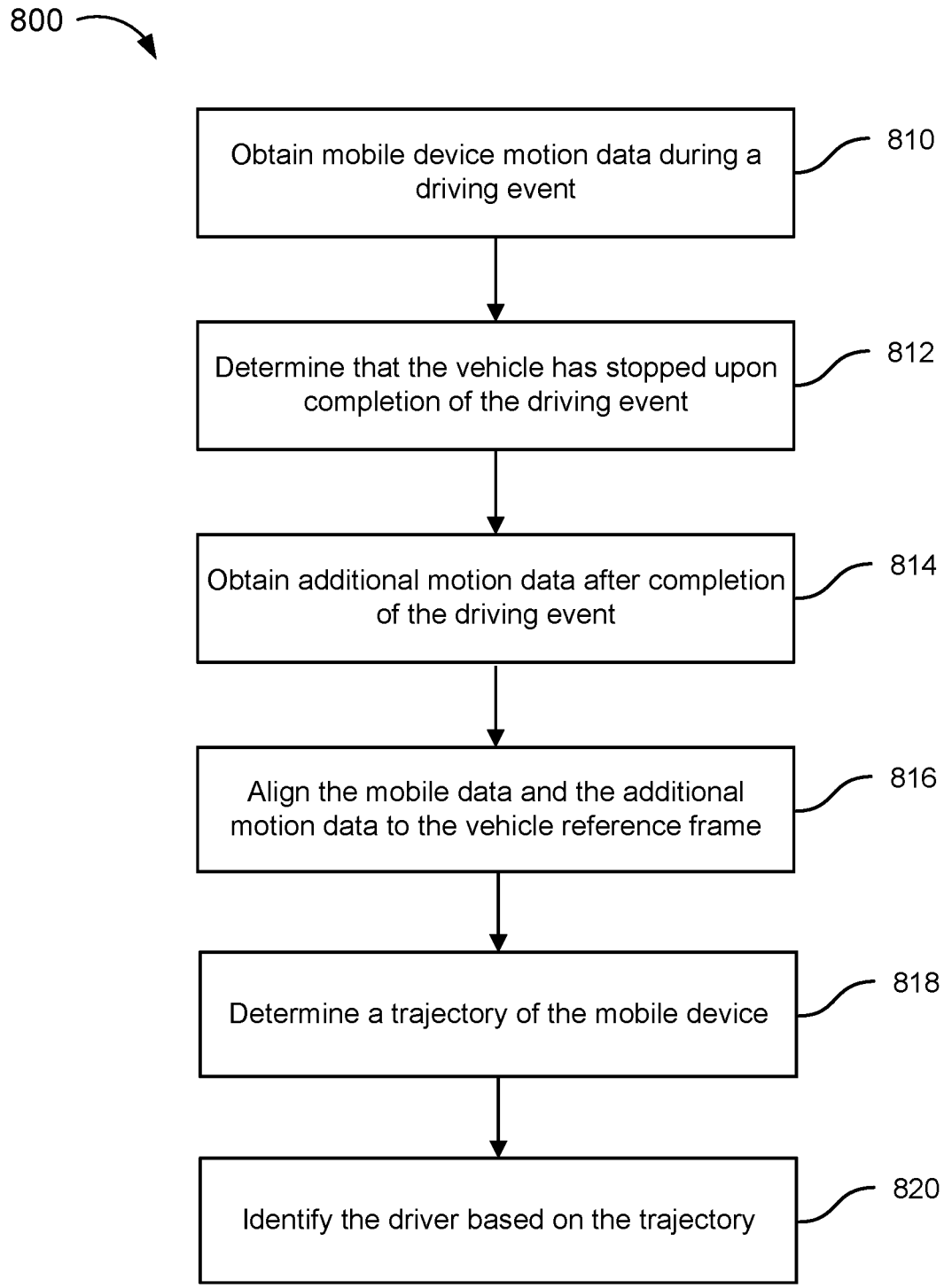
FIG. 8 is a simplified flowchart illustrating a method of identifying a driver of a vehicle having a vehicle reference frame according to an embodiment of the present invention.

FIG. 8 is a simplified flowchart illustrating a method of identifying a driver of a vehicle having a vehicle reference frame according to an embodiment of the present invention. The method (800) includes obtaining mobile device motion data in a mobile device reference frame during a driving event (810) and determining that the vehicle has stopped at completion of the driving event (812). The method also includes obtaining additional mobile device motion data after completion of the driving event (814) and aligning the mobile device motion data and the additional mobile device motion data to the vehicle reference frame (816).

The method further includes determining that a trajectory of the additional mobile device motion data correlates with a direction aligned with a driver side of the vehicle reference frame (818) and identifying the driver of the vehicle based on the trajectory (820). As an example, after the completion of the driving event, the driver will exit the car on the left side of the vehicle. This contrasts with a passenger having the mobile device, who will exit from the right of the vehicle. In performing the method illustrated in FIG. 8, the methods and systems utilized herein to align the reference frame of the mobile device to the reference frame of the vehicle can be utilized. Alignment of the reference frames of the mobile device and the vehicle during the driving event can be performed during the driving event, after the driving event, or using combinations of these approaches. One of ordinary skill in the art would recognize many variations, modifications, and alternatives.

It should be appreciated that the specific steps illustrated in FIG. 8 provide a particular method of identifying a driver of a vehicle having a vehicle reference frame according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
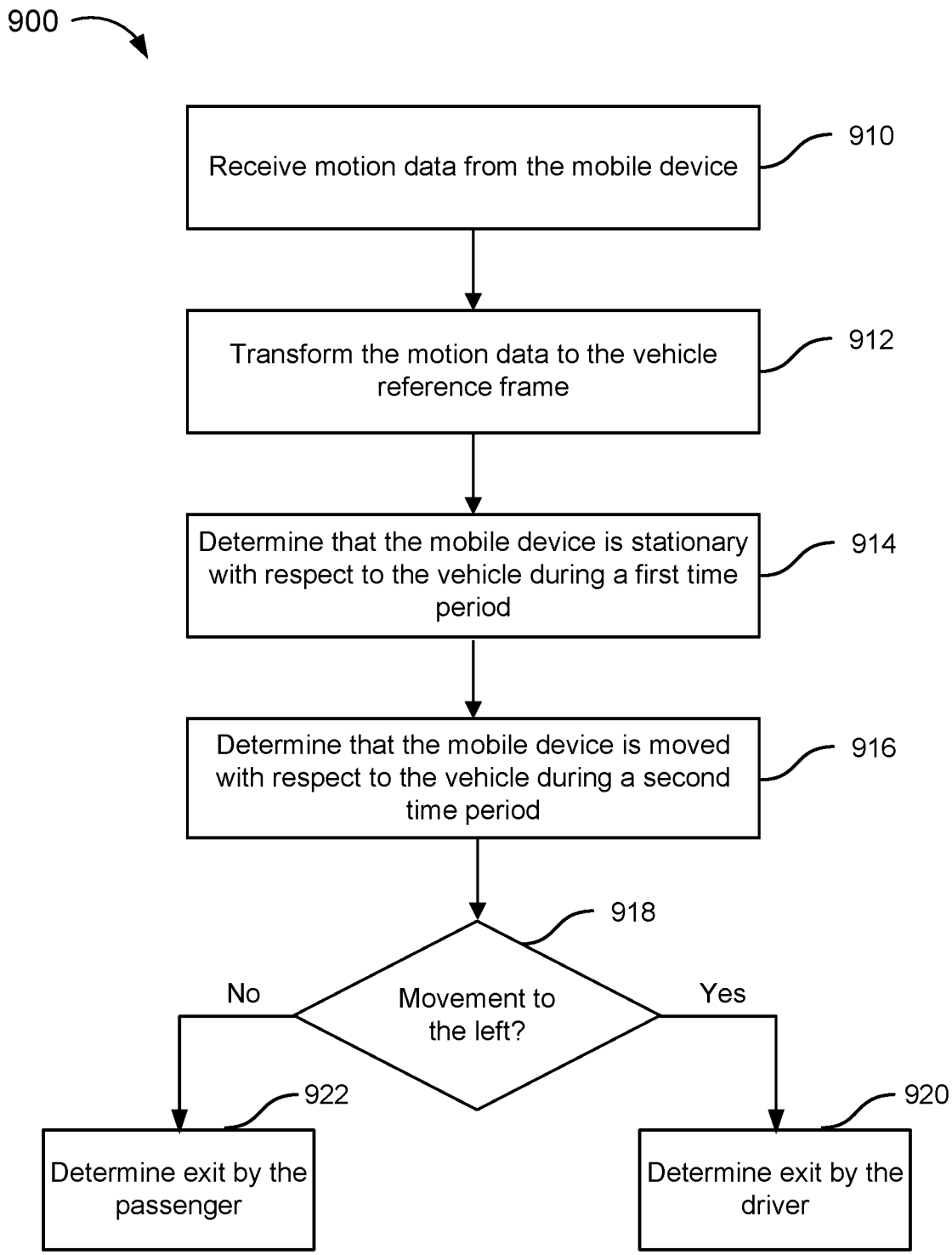
FIG. 9 is a simplified flowchart illustrating a method of performing exit detection according to an embodiment of the present invention.

FIG. 9 is a simplified flowchart illustrating a method of performing exit detection according to an embodiment of the present invention. Exit detection can include detecting that the driver has exited the vehicle or that a passenger has exited the vehicle. As described herein, these methods include determining if the phone is moving from the center of the vehicle to the left, which is associated with driver exit, or from the center of the vehicle to the right, which is associated with passenger exit. The method (900) includes receiving motion data from the mobile device, measured in the mobile device reference frame (910). The method also includes transforming the motion data to the vehicle reference frame (912) and determining that the mobile device is stationary with respect to the vehicle reference frame during a first time period (914).

The method further includes determining that the mobile device is moved with respect to the vehicle reference frame during a second time period (916). If the movement during the second time period was directed to the left (918—Yes), which indicates that the driver has moved the mobile device, then a determination is made that the driver of the vehicle has exited the vehicle (920). If the movement during the second time period was directed to the right (918—No), which indicates that the passenger has moved the mobile device, then a determination is made that the passenger of the vehicle has exited the vehicle (922). In performing the method illustrated in FIG. 9, the methods and systems utilized herein to align the reference frame of the mobile device to the reference frame of the vehicle can be utilized. Alignment of the reference frames of the mobile device and the vehicle can be performed during the driving event, after the driving event, or using combinations of these approaches. One of ordinary skill in the art would recognize many variations, modifications, and alternatives.

It should be appreciated that the specific steps illustrated in FIG. 9 provide a particular method of performing exit detection according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of providing a quaternion for reference frame transformation, the method comprising:
   (a) initiating a driving event in a vehicle having a vehicle reference frame;
   (b) receiving, from a mobile device having a mobile device reference frame, mobile device data associated with a time stamp;

(c) determining, from the mobile device data, a first orientation of a gravity vector with respect to a first axis of the mobile device reference frame;
(d) determining, from the mobile device data, a second orientation of a magnetic direction with respect to a second axis of the mobile device reference frame;
(e) determining, using Global Positioning System (GPS) data provided by a GPS unit, a direction of travel for the vehicle with respect to the magnetic direction;
(f) determining a vertical inclination angle for the vehicle, wherein determining the vertical inclination angle for the vehicle comprises determining an altitude change and a distance change using the GPS data provided by the GPS unit;
(g) computing a quaternion that represents a rotation between the mobile device reference frame and the vehicle reference frame using the first orientation, the second orientation, the direction of travel and the vertical inclination angle for the vehicle;
(h) determining if the driving event is complete;
incrementing the time stamp and iterating steps (b), (c), (d), (e), (f), (g), and (h) if the driving event is not complete; and
providing the quaternion for reference frame transformation if the driving event is complete.

2. The method of claim 1 wherein the mobile device data is received in the mobile device reference frame.

3. The method of claim 2 wherein iterating steps (b), (c), (d), (e), (f), (g), and (h) produces a vector including a plurality of quaternions as a function of time.

4. The method of claim 3 further comprising using the vector to convert a string of the mobile device data in the mobile device reference frame into a string of data referenced to the vehicle reference frame.

5. The method of claim 2 further comprising utilizing the quaternion to transform the mobile device data in the mobile device reference frame into the vehicle reference frame.

6. The method of claim 1 further comprising:
obtaining motion data from the mobile device during the driving event;
orienting the obtained motion data to the vehicle reference frame using the quaternion; and
identifying a use of the mobile device by a driver during the driving event in response to:
determining that the mobile device has moved to the left with respect to the vehicle; and
determining that a front screen of the mobile device faces to the left with respect to the vehicle.

7. The method of claim 6 wherein determining that the front screen of the mobile device faces to the left with respect to the vehicle is performed after determining that the mobile device has moved to the left with respect to the vehicle.

8. The method of claim 6 wherein the motion data from the mobile device is obtained in the mobile device reference frame.

9. The method of claim 6 wherein the motion data includes accelerometer data.

10. The method of claim 6 wherein the motion data includes magnetometer data.

11. The method of claim 6 wherein the motion data is oriented to the vehicle reference frame by aligning a first axis of the mobile device with a gravity vector, aligning a second axis of the mobile device with a magnetic vector, and aligning the second axis to the direction of travel.

12. The method of claim 1, wherein computing the quaternion comprises:
generating, from the first orientation of the gravity vector with respect to the first axis of the mobile device reference frame, a first quaternion that rotates the mobile device reference frame to align the first axis with the gravity vector;
generating, from the second orientation of the magnetic direction with respect to the second axis of the mobile device reference frame, a second quaternion that rotates the mobile device reference frame to align the second axis with the magnetic direction;
generating, from the direction of travel for the vehicle, a third quaternion that represents a rotation from the magnetic direction to the direction of travel for the vehicle; and
combining the first quaternion, the second quaternion, and the third quaternion into the quaternion.

* * * * *